United States Patent [19]
Simmons et al.

[11] 3,889,446
[45] June 17, 1975

[54] PROCESS FOR FORMING PARTITIONED FILM PACKAGES AND APPARATUS FOR USE THEREIN

[75] Inventors: Walter John Simmons, Martinsburg; Frank Marsden Willis, Hedgeville, both of W. Va.

[73] Assignee: E. I. du Pont de Nemours & Company, Wilmington, Del.

[22] Filed: June 18, 1974

[21] Appl. No.: 480,410

[52] U.S. Cl. ............................... 53/28; 53/180
[51] Int. Cl. ..................................... B65b 9/12
[58] Field of Search ............... 53/28, 178, 180, 185

[56] References Cited
UNITED STATES PATENTS

| | | | |
|---|---|---|---|
| 3,210,907 | 10/1965 | Thurlings | 53/28 X |
| 3,391,047 | 7/1968 | Kopp | 53/28 X |

Primary Examiner—Travis S. McGehee

[57] ABSTRACT

High-speed forming of a series of partitioned tubular film packages, e.g., rock bolt resin cartridges, wherein different materials are maintained on opposite sides of a strip-like or tubular partition which is secured to the ends of the package, by forming and advancing a continuous tube of film and advancing a film barrier layer (a strip or smaller-diameter tube) within the advancing tube at substantially the same rate therewith; filling the tube with two different materials on opposite sides of the barrier layer; constricting the tube around the barrier layer at spaced intervals and applying a pair of encircling closure means thereto; and severing the tube between the pair of closure means.

Apparatus for advancing and filling nested tubes to produce a tubular package having an inner tubular barrier layer secured to the ends thereof.

11 Claims, 9 Drawing Figures

PROCESS FOR FORMING PARTITIONED FILM PACKAGES AND APPARATUS FOR USE THEREIN

BACKGROUND OF THE INVENTION

1. Field of the Invention

The present invention relates to a process for forming tubular film packages, e.g., rock bolt resin packages, wherein materials, especially reactive materials, are stably maintained on opposite sides of a partition secured to the ends of the package.

2. Description of the Prior Art

In end-use applications which operate on the basis of a physical change effected in a mixture by a rapid chemical reaction of components thereof, e.g., in the anchoring of a structural element within a surrounding structure by curing of a soft resin composition around the element at ambient temperature to cause the resin to set up hard, it is expedient to pack certain components of the mixture on opposite sides of a divider or barrier in a unitary package so that the components can be brought together easily in the required proportions by rupture or displacement of the barrier at, or just prior to, the time when the physical change is to be effected, i.e., when the mixture is in proper position at the location of use. Packaging the components in this manner prevents any substantial physical change from occurring before the mixture has been properly positioned, in which case the mixture would be incapable of functioning as designed.

In one particular end-use of the above type, the quick-setting property of certain resin systems is utilized to fix anchor bolts in drill holes, such bolts being used, for example, as strengthening members in rock formations, such as in a roof support system for coal mines. First, one or more preferably cartridge-type packages containing a polymerizable resin formulation are inserted into a drill hole, followed by the bolt or reinforcing rod. The latter compresses the resin package(s) towards the bottom of the hole and tears the package(s), and, when rotated, mixes the components thereof, whereupon the resin cures and hardens.

For resin systems which are quick-setting, e.g., which harden within as little as a few seconds at room temperature, the need for compartmented or partitioned packages to prevent setting before the bolt is in place has been recognized. In such systems, the polymerizable resin composition and a catalyst composition generally are located on opposite sides of a partition, and the package is broken and the compositions mixed at the time that setting is desired.

Various types of packaging units are known wherein two reactive components of a chemical system are physically separated by means of a barrier layer produced or interposed between them. In some packages, e.g., those described in U.S. Pat. Nos. 2,862,616 and 3,731,791, reactive components are packed initially in direct contact, whereby a layer of reaction product forms at the interface and inhibits further interaction. U.S. Pat. No. 2,982,396 describes interposing a barrier layer, e.g., an oil, varnish, alkyd, wax or gel, which is chemically compatible with the interaction product of the components it is sandwiched between. U.S. Pat. No. 3,756,389 describes an envelope-type package having peripherally bonded thereto a barrier sheet having a locally thinned section to facilitate subsequent rupturing thereof. U.S. Pat. Nos. 2,932,385 and 3,087,606 relate to packages wherein an internal barrier layer or diaphragm is adapted to be displaced or ruptured without opening of the package per se by a suitable manipulation of the package.

In a two-component tubular package described in U.S. Pat. No. 3,737,027, the barrier layer between a hardening resin and a hardener therefor is a tubular container which contains the hardener and is disposed within an outer tubular container for the resin, the ends of the nested containers being crimped and sealed by encircling closure members.

Of the various types of dual-component packages known to the art, those wherein a barrier layer is interposed between the reactive components (as contrasted to those wherein the formation of a barrier layer depends solely on the interfacial reaction of the components initially in direct contact) are preferred inasmuch as they more reliably prevent a gross reaction of the components which could interfere with the functioning of the package as required. Also, the cartridge type, i.e., tubular or cylindrical, package is preferred for more efficient use in drill holes.

The technical advantage offered by a cartridge-type package having an internal partition or barrier for separating reactive components is increased considerably if a high-speed method is available for producing the package. U.S. Pat. No. 3,795,081 describes a method for continuously producing a series of compartmented packages wherein a web of film is formed into an advancing convoluted tube having a partially single-ply and partially double-ply wall, sealing the inner to the outer ply along the edges of the web to form a tube having two adjacent compartments with the barrier-forming inner ply common to both compartments, filling the compartments, and forming the filled portion of the tube into a series of end-sealed cartridges. However, high-speed, e.g., continuous, methods have not been delineated for producing other cartridge-type partitioned packages, e.g., packages such as the one described in U.S. Pat. No. 3,737,027, wherein the partition is secured at the ends of the cartridge, but unattached to the sides thereof.

SUMMARY OF THE INVENTION

The present invention provides a process for forming a series of partitioned film packages comprising:

a. drawing a web of pliable film material into a cylindrical forming member so as to bring the web's edges together in overlapping relationship and thereby form the web into a tube, and advancing the tube through and past the forming member;

b. feeding a layer, e.g., a strip or tubular layer, of pliable film material through the forming member and advancing the layer within the advancing tube at a rate substantially equal to the rate of advancement of the tube;

c. bringing the advancing tube into a confronting relationship with sealing means adapted to produce a seal between facing surface zones of the web adjacent the overlapping edges thereof in a manner such as to form, as the tube advances, a continuous linear juncture adjacent the edges of the web substantially parallel to the longitudinal axis of the tube;

d. discharging two streams of fluent material into the advancing tube on opposite sides of the advancing layer of pliable film material, the material discharged on one side of the layer being different in composition from that discharged on the other;

e. bringing the filled portion of the advancing tube into periodic engagement with constricting and sealing means which constricts the tube around the layer of pliable film material at spaced intervals and applies a pair of successive encircling closure means to the tube in each constricted area; and f. severing the tube in the constricted areas between each pair of closure means.

Preferably, the present process is performed continuously, i.e., with substantially no interruption in the formation, advancement, and filling of the tube and in the advancement of the barrier layer within the tube. Machines capable of producing a series of individual packages continuously from a continuous tube, e.g., the apparatus described in U.S. Pat. No. 2,831,302, preferably are employed as these provide maximum packaging rates. However, intermittent advancement of the tube and barrier layer also is within the purview of the present invention. For example, the advancing and filling steps can be interrupted during the tube-sealing step.

This invention also provides an apparatus for use in the present process wherein the layer of pliable film material is a tubular layer which is advanced and filled while nested within the tube that forms the package, the apparatus comprising:

a. a first tubular filling member adapted (1) to pass through a first cylindrical tube-forming member and into a first tube of pliable film material formed in said first forming member and (2) to discharge a fluent material into said first tube;

b. a second tubular filling member adapted (1) to pass through a second cylindrical tube-forming member and into a second tube of pliable film material formed in said second forming member and 2. to discharge a fluent material into said second tube, said second tube of pliable film material and said second filling member being adapted together to pass through said first tube-forming member and into said first tube of pliable film material;

c. a first drive means adapted to engage said second tube of pliable film material prior to the passage thereof into the first tube-forming member whereby the second tube of pliable film material is advanced;

d. a second drive means adapted to engage and advance the first tube of pliable film material, the discharge ends of the first and second filling members being located between the second drive means and a zone where the nested first and second tubes are jointly closed;

e. means associated with the first and second tubes of pliable film material for measuring the rate of advance thereof; and f. means associated with the advance-rate-measuring means for adjusting the rate of advance of one of the tubes so that it substantially equals the rate of advance of the other.

The layer of pliable film material forms a partition or barrier between the two different fluent materials in each package, either as a strip which spans the tubular package so that both edges of the strip engage the tube wall, or as an inner tube which encloses one of the materials while the other material is located in the space between the walls of the nested inner and outer tubes. The barrier layer is secured to the cartridge-type package at the ends thereof by virtue of being jointly constricted and closed therewith, but is unattached to the wall of the package. When the barrier layer is an inner tube, the two fluent materials remain completely separated from each other if the inner tube is seamless or a continuously sealed seamed tube. When the barrier layer is a strip, it is possible that the two materials can come into contact with each other along the strip's edges. In certain instances, as in the case of rock bolt resin/catalyst packages, the limited degree of contact of the two materials along a barrier strip's edges or along a discontinuous seal in a seamed tubular barrier does not interfere with the usefulness of the package. However, the package wherein the two materials remain completely separated from each other is preferred as it allows complete control of the timing of the reaction between the fluent materials, i.e., reaction occurs only upon breakage of the barrier layer therebetween.

BRIEF DESCRIPTION OF THE DRAWING

In the accompanying drawing, which illustrates specific embodiments of the process and apparatus of this invention.

In the drawing, like numerals designate similar elements.

DETAILED DESCRIPTION

Figure 1:
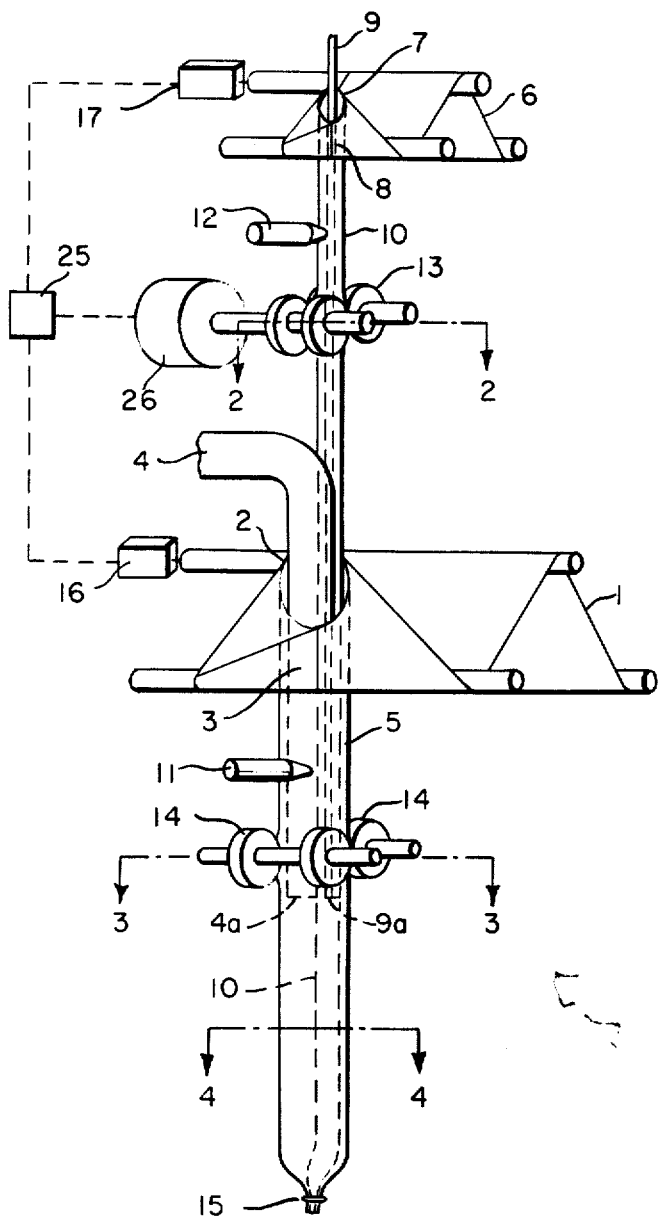
FIGS. 1 and 5 are perspective views of portions of packaging machines which can be employed for carrying out the present process to produce a package wherein the barrier layer is tubular, the apparatus shown in FIG. 1 embodying a different means than that shown in FIG. 5 for advancing two nested film tubes.

The process and apparatus of the invention will be described by way of examples, with reference to the apparatus shown in the drawing.

EXAMPLE 1

In FIG. 1, a first continuous web 1 of pliable film material, e.g., a laminate of polyethylene terephthalate sandwiched between layers of polyethylene, 3.75 inches (95.3 mm.) wide and 0.0015 inch (0.038 mm.) thick, moves continuously from a supply roll (not shown), passing alternately in an upward, downward, and upward direction around a series of guide bars or rollers and thence upwardly and over the upper curved edge 2 of a first cylindrical tube-forming member 3 having an inner diameter of 1.00 inch (25.4 mm.), and down around a first hollow tubular filling member 4 having an inner diameter of 0.375 inch (9.53 mm.). In like manner, a second web 6 of pliable film material, e.g., the same film as in web 1, moves upwardly and over the upper curved edge 7 of a second cylindrical tube-forming member 8 having an inner diameter of 0.313 inch (7.94 mm.), and down around a second hollow tubular filling member 9 having an inner diameter of 0.125 inch (3.18 mm.). Filling member 9 and tube 10 formed in forming member 8 pass through forming member 3 and into tube 5 formed in forming member 3.

Forming member 8 is cut and shaped to form a collar around filling member 9, the upper edge 7 being shaped or cut away to cause web 6 to reverse its direction and to guide the edges of web 6 downwardly and into overlapping tube-forming relation around filling member 9. As the film advances over and into cylindrical forming member 8 around filling member 9, it is formed into tube 10 having a diameter of 0.313 inch (7.94 mm.). Tube 10 constitutes the barrier layer in the package. In like manner, forming member 3 is cut and shaped to form a collar around filling member 4 and tube 10 (and filling member 9 within tube 10), the upper edge 2 being shaped or cut away to cause web 1 to reverse its direction and guide the edges of web 1 downwardly into overlapping tube-forming relation around filling member 4 and tube 10. As the film advances over and into cylindrical forming member 3 around filling member 4 and tube 10, it is formed into tube 5 having a diameter of 1.00 inch (25.4 mm.).

Figure 2:
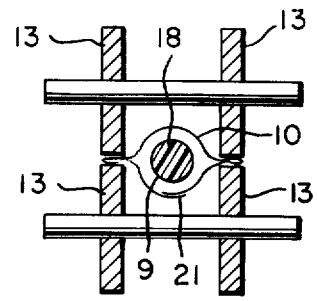
FIGS. 2, 3, and 4 are cross-sections taken through planes 2—2, 3—3, and 4—4, respectively, of the apparatus and package shown in FIG. 1.

Advancing tubes 5 and 10 are longitudinally sealed along their overlapping edges by bringing them into a confronting relationship with sealing means, e.g., hot air jets emanating from air heaters 11 and 12, respectively, thereby forming linear junctures 20 (See FIG. 3) and 21 (See FIG. 2), respectively. The locations of the sealing means for tube 5 and tube 10 are such that the advancing tubes reach the sealing means prior to reaching the discharge ends 4a and 9a of filling members 4 and 9, respectively. Also, tube 10 advances past sealing means 12 prior to reaching forming member 3.

At a location between sealing means 12 and forming member 3, tube 10 is engaged at diametrically opposed sides by a first drive means, in this case two cooperating pairs of feed rollers 13, each pair of rollers engaging tube 10 for the continuous advancement thereof toward forming member 3. At a location between forming member 3 and the filling member discharge ends 4a and 9a, tube 5 is engaged at diametrically opposed sides by a second drive means, in this case two cooperating pairs of feed rollers 14, each pair of rollers engaging tube 5 for the continuous advancement thereof toward a tube-constricting and -sealing unit (not shown).

A stream of fluent material emanates continuously from discharge end 4a and discharge end 9a as nested tubes 5 and 10 are advanced beyond ends 4a and 9a, the material 18 emanating from filling member 9 thus being discharged into inner tube 10 and the material 19 from filling member 4 into the space between the walls of nested tubes 5 and 10. The tube-constricting and -sealing unit, located below discharge ends 4a and 9a and described in U.S. Pat. No. 2,931,302, periodically engages the filled portion of the advancing nested tubes so as to jointly constrict the tubes at spaced intervals and apply a pair of encircling closure means to the tubes in each constricted area. The unit also severs the tubes between the closures to provide successive individual packages which are closed at opposite ends by the closure members. FIG. 1 shows the tubes with one closure member, e.g., a band or clip, 15 remaining after a cut has been made between a pair of such closure members and prior to application of the next pair.

Figure 3:
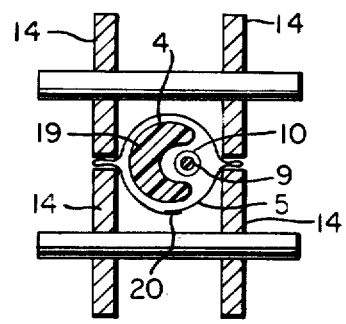
Figure 4:

In the embodiment shown in FIG. 1, filling member 4 has a generally exaggerated kidney-shaped configuration and a larger cross-sectional area than filling member 9, which is substantially circular (See FIG. 3). This allows filling members 4 and 9 to fit inside forming member 3 while providing a larger cross-sectional area of filling member 4 than obtainable with a circular member capable of fitting inside the forming member together with circular filling member 9.

Associated with tubes 5 and 10 are means 16 and 17 for measuring the rate of advance of the tubes, e.g., tachometers which measure the speed of rotation of idler rolls over which the webs being formed into tubes are drawn. In order to maintain a rate of advance of tube 5 substantially equal to that of tube 10, which is important for avoiding package distortion, advance-rate-measuring means 16 and 17 are connected to a ratio controller 25. Ratio controller 25 is connected to motor 26, which drives feed rollers 13 and automatically controls the speed of tube 10 so that it equals that of tube 5. Speeds in the range of about from 20 to 200 feet per minute are feasible.

The materials discharged from filling members 4 and 9 are fluent materials, i.e., flowable solids or liquids such as pumpable materials, granular materials, or extrudable paste-like materials, the material 18 discharged into tube 10 being different in composition from the material 19 discharged into the space between the walls of tubes 5 and 10. In the case of forming packages for rock bolt resin systems, the material discharged from filling member 4, for example, can be a polyester resin composition, and that discharged from filling member 9 can be a catalyst or initiation composition for the resin system.

EXAMPLE 2

Figure 5:
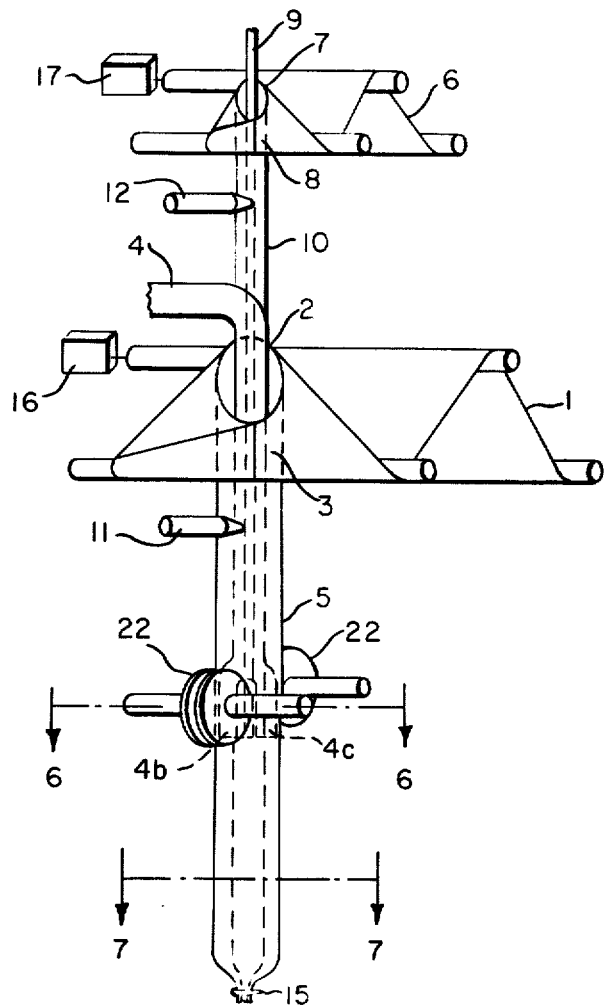
Figure 6:
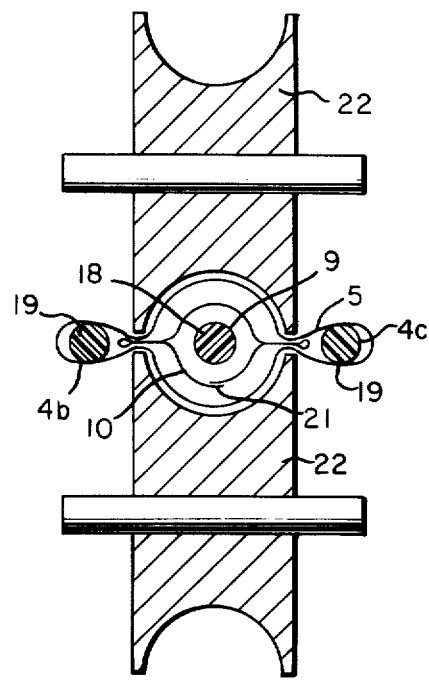
FIGS. 6 and 7 are cross-sections taken through planes 6—6 and 7—7, respectively, of the apparatus and package shown in FIG. 5.
Figure 7:
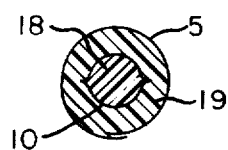

The process described in Example 1 is repeated except that the embodiment shown in FIGS. 5 and 6 is employed. In this embodiment, tubes 5 and 10 are advanced by a common drive means consisting of a single pair of feed rollers or drive wheels 22, the edge surfaces of which are contoured so that they engage tubes 5 and 10 at corresponding diametrically opposed sides for the continuous advancement thereof while allowing filling member 9 to pass between the wheels. Filling member 4 is bifurcated at a location above drive wheels 22 so that the wheels pass between tubular branch portions 4b and 4c, each of which passes through a temporarily pinched and deformed portion of the wall of tube 5, the tube wall returning to its original circular configuration after disengagement from drive wheels 22, as shown in FIG. 7. In this case, tachometers 16 and 17 again indicate the rate of advancement of tubes 5 and 10, respectively. However, the tube advancement rates are not independently controlled.

EXAMPLE 3

Figure 8:
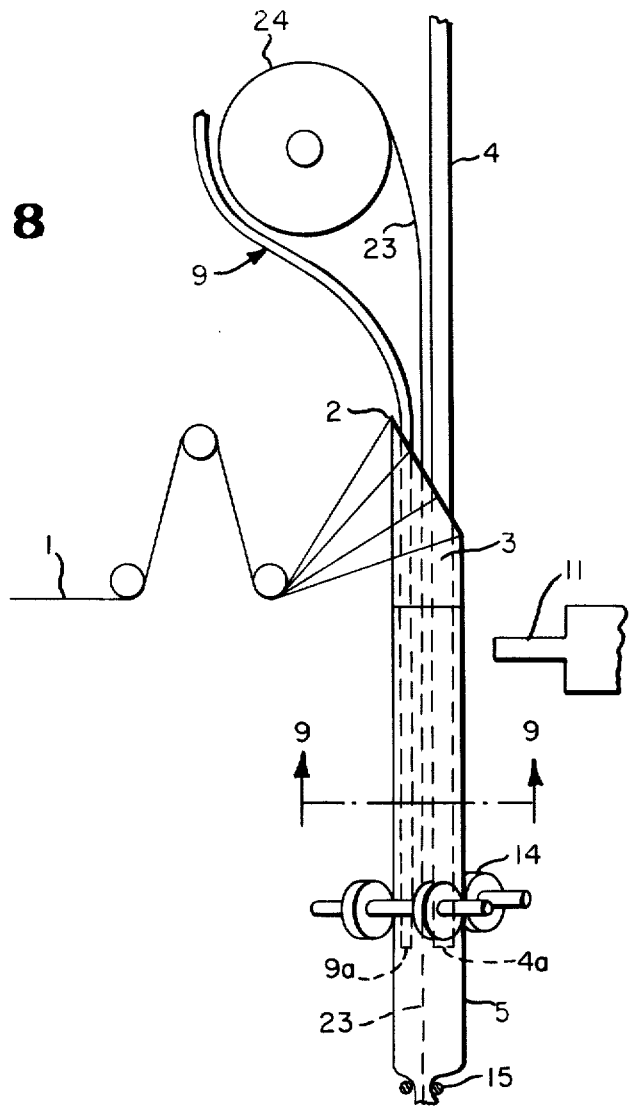
FIG. 8 is a schematic representation of a portion of a packaging machine which can be employed for carrying out the present process to produce a package wherein the barrier layer is a strip.
Figure 9:
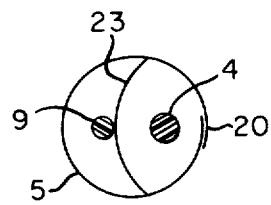
FIG. 9 is a cross-section taken through plane 9—9 of the apparatus shown in FIG. 8.

The apparatus shown in FIG. 8 is employed to produce a partitioned tubular package in which the barrier layer is a strip which spans the package so that the strip's edges engage the tube wall. Web 1, forming member 3, filling members 4 and 9, sealing means 11, tube 5, drive means 14, and closure member 15 are as described in Example 1, except that filling member 4 has a circular cross-section. As tube 5 advances, a strip of pliable film material 23, 1.00 inch (25.4 mm.) wide and 0.0005 inch (0.0013 mm.) thick, made, for example, of the same material as web 1, moves continuously from a supply roll 24, is fed through forming member 3, and advanced through tube 5 between filling members 4 and 9. Strip 23 advances by virtue of being jointly constricted and closed with tube 5 (by closure member 15), tube 5 in turn being advanced by drive means 14. As shown in FIG. 9, the edges of strip 23 engage the wall of tube 5, and filling members 4 and 9 are located on opposite sides of strip 23 so as to discharge two different fluent materials on opposite sides of strip 23.

The specific film material employed as the package and barrier material in the present process, the specific fluent materials loaded into the package, and the type of sealing means used to produce the longitudinal seal are not critical features of the present process and can vary as described in the aforementioned U.S. Pat. No. 3,795,081. The barrier material can be the same as, or different from, the package material.

In the present process a layer of pliable film material is advanced within an advancing tube at substantially the same rate as the latter. The manner in which this is accomplished can vary. Preferably, a separate drive means is provided for the advancement of the package tube (5 in the drawing) and for the advancement of the barrier layer (10 and 23 in the drawing). This permits better control of the advancement rates to achieve substantial equality of the rates. However, as shown in FIG. 5, a single drive means can be used to advance two nested tubes provided it is designed to allow passage of the filling members and gripping of the walls of both tubes. Advancement of a strip through a tube can be effected by virtue of the attachment of the strip to the tube (by closure member 15, FIG. 8), which in turn is advanced by drive means in engagement therewith.

Although the invention has been described as including the formation and filling of a tubular barrier layer with the filling member therefor passing through the forming member for the package tube and into the latter itself, the invention contemplates pre-forming as well as pre-filling of the barrier tubular layer. In other words, tube 10 can be pre-formed rather than formed in forming member 8, and it also can be pre-filled prior to passing into tube 5.

The barrier layer extends the length of the package and has its ends jointly constricted with the package tube ends. Tubular barrier layers should be of smaller diameter than the package diameter. Strip barrier layers should span the package, and preferably are wider than the package diameter so as to effect better separation of the materials on opposite sides thereof.

We claim:

1. A process for forming a series of partitioned film packages comprising:
   a. drawing a web of pliable film material into a cylindrical forming member so as to bring the web's edges together in overlapping relationship and thereby form said web into a tube, and advancing said tube through and past said forming member;
   b. feeding a layer of pliable film material through said forming member and advancing said layer within said advancing tube at a rate substantially equal to the rate of advancement of said tube;
   c. bringing said advancing tube into a confronting relationship with sealing means adapted to produce a seal between facing surface zones of said web adjacent the overlapping edges thereof in a manner such as to form, as the tube advances, a continuous linear juncture adjacent the edges of said web substantially parallel to the longitudinal axis of said tube;
   d. discharging two streams of fluent material into said advancing tube on opposite sides of said advancing layer of pliable film material, the material discharged on one side of said layer being different in composition from that discharged on the other;
   e. bringing the filled portion of said advancing tube into periodic engagement with constricting and sealing means which constricts said tube around said layer of pliable film material at spaced intervals and applies a pair of successive encircling closure means to said tube in each constricted area; and
   f. severing said tube in the constricted areas between each pair of closure means.

2. A process of claim 1 wherein said tube advances continuously.

3. A process of claim 1 wherein said layer of pliable film material is tubular, a first stream of fluent material being discharged into, and a second stream outside, said tubular layer.

4. A process of claim 1 wherein said layer of pliable film material is a strip which spans said tube so that both of its edges engage the tube wall.

5. A process of claim 4 wherein said streams of fluent material are discharged from tubular filling members which extend through said forming member, said tube is advanced by frictional engagement thereof with tubeadvancing means at a location between said sealing means and the discharge ends of said tubular filling members, and said strip is advanced along with said tube by virtue of being constricted therewith.

6. A process for forming a series of partitioned film packages comprising:
   a. drawing a first and a second web of pliable film material into a first and a second cylindrical forming member, respectively, so as to bring each web's edges together in overlapping relationship and thereby form said first web into a first tube and said second web into a second tube;
   b. advancing said first tube through the past said first forming member and bringing said advancing tube into a confronting relationship with a first sealing means adapted to produce a seal between facing surface zones of said first web adjacent the overlapping edges thereof in a manner such as to form, as said first tube advances, a linear juncture adjacent the overlapping edges of said first web substantially parallel to the longitudinal axis of said first tube;
   c. advancing said second tube through the past said second forming member;
   d. subsequent to having brought said first tube into confronting relationship with said sealing means, feeding said first tube through said second forming member and advancing said first tube while nested within said advancing second tube at a rate substantially equal to the rate of advancement of said second tube;
   e. bringing said second tube into a confronting relationship with a second sealing means adapted to produce a seal between facing surface zones of said second web adjacent the overlapping edges thereof in a manner such as to form, as said second tube advances, a continuous linear juncture adjacent the overlapping edges of said second web substantially parallel to the longitudinal axis of said second tube;

f. discharging a first stream of fluent material into said first tube and a second stream of fluent material into the space between the walls of the nested tubes, the material in said first stream being different in composition from that in said second stream;

g. bringing the filled portion of said advancing nested tubes into periodic engagement with constricting and sealing means which jointly constricts the tubes at spaced intervals and applies a pair of successive encircling closure means to the tubes in each constricted area; and h. severing said tubes in the constricted areas between each pair of closure means.

7. A process of claim 6 wherein said tubes advance continuously.

8. A process of claim 6 wherein said first stream of fluent material is discharged from a first tubular filling member which extends through both said first and second forming members, and said second stream of fluent material is discharged from a second tubular filling member which extends through said second forming member.

9. A process of claim 8 wherein said first tube is advanced by frictional engagement thereof with a first tube-advancing means at a location between said first sealing means and said second forming member, and said second tube is advanced by frictional engagement thereof with a second tube-advancing means at a location between said second sealing means and the discharge ends of said first and second tubular filling members.

10. A process of claim 8 wherein said first and second tubes are advanced by frictional engagement thereof with tube-advancing means at a location between said second sealing means and the discharge ends of said first and second tubular filling members.

11. Apparatus for filling and advancing two nested tubes of pliable film material jointly closed at one end comprising:

a. a first tubular filling member adapted to pass into a first tube of pliable film material for discharging a fluent material therein;

b. a second tubular filling member adapted to pass into a second tube of pliable film material for discharging a fluent material therein and therewith into said first tube of pliable film material, the diameter of said second tube being smaller than that of the first;

c. a first drive means adapted to engage the second tube of pliable film material prior to the passage thereof into said first tube of pliable film material and to advance said second tube;

d. a second drive means adapted to engage and advance the first tube of pliable film material, the discharge ends of said first and second filling members being located between said second drive means and a zone where the nested first and second tubes are jointly closed;

e. means associated with said first and second tubes for measuring the rate of advance thereof; and f. means associated with the advance-rate-measuring means for adjusting the rate of advance of one of said tubes so that it substantially equals the rate of advance of the other.

* * * * *